United States Patent
Wada

(10) Patent No.: US 6,453,689 B2
(45) Date of Patent: Sep. 24, 2002

(54) REFRIGERATING/AIR-CONDITIONING APPARATUS AND CONTROL METHOD THEREFOR

(75) Inventor: Keiji Wada, Oizumi-machi (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/794,754

(22) Filed: Feb. 26, 2001

(30) Foreign Application Priority Data

Mar. 2, 2000 (JP) ........................................ 2000-057465

(51) Int. Cl.$^7$ ............................................... F24F 11/02
(52) U.S. Cl. ........................................... 62/175; 236/51
(58) Field of Search ........................... 62/126, 125, 127, 62/129, 130, 175; 236/51, 94; 165/209, 208

(56) References Cited

U.S. PATENT DOCUMENTS

| 5,279,458 | A | * | 1/1994 | DeWolf et al. | 236/47 |
| 5,383,336 | A | * | 1/1995 | Nishida et al. | 62/175 X |
| 5,630,324 | A | * | 5/1997 | Yoshida et al. | 236/51 X |
| 5,853,123 | A | * | 12/1998 | Okano et al. | 62/175 X |
| 5,927,398 | A | * | 7/1999 | Maciulewicz | 236/51 X |

FOREIGN PATENT DOCUMENTS

JP      5-248684      9/1993

\* cited by examiner

*Primary Examiner*—Harry B. Tanner
(74) *Attorney, Agent, or Firm*—Darby & Darby

(57) ABSTRACT

In a refrigerating/air-conditioning apparatus including operating/controlling units such as outdoor units, indoor units and control devices for individually or collectively controlling the driving of the outdoor units and the indoor units, each operating/controlling unit being equipped with a controller for controlling the driving of the operating/controlling unit, the controller having a rewritable memory for storing a control program, control parameter data, control data, etc., and the controllers being connected to one another through communication lines, there is provided at least one data writer which is connected to at least one of the operating/controlling units to transmit control communication data to the controllers of the operating/controlling units when the content of the memory of the controller of at least one of the operating/controlling units is required to be written/rewritten, wherein the control communication data contains identification information with which each controller judges whether the control communication data received is addressed to the operating/controlling unit of the controller concerned, and if the control communication data is judged to be addressed to the operating/controlling unit of the controller concerned, the controller writes/rewrites the control data, etc. of the memory thereof.

10 Claims, 2 Drawing Sheets

REFRIGERATING/AIR-CONDITIONING APPARATUS AND CONTROL METHOD THEREFOR

BACKGROUND OF THE INVENTION

1. Field of the Invention

The present invention relates to a refrigerating/air-conditioning apparatus which is controlled on the basis of a control program, control data, etc. stored in a memory of a controller for controlling the driving of the refrigerating/air-conditioning apparatus, and a control method for the refrigerating/air-conditioning apparatus, and particularly to a refrigerating/air-conditioning apparatus in which the control program, the driving control data and other data stored in the memory can be easily rewritten or these data can be easily written into the memory, and a control method for the refrigerating/air-conditioning apparatus.

2. Description of the Related Art

In a refrigerating/air-conditioning apparatus containing a refrigerating air conditioner for heating/cooling large-size structures such as buildings, etc. and a refrigerating machine for a business show case, a low-temperature warehouse or the like, the refrigerating cycle is carried out as follows. That is, refrigerant is hermetically filled in a hermetically-sealed refrigerant circuit in which a compressor, a condenser, an expansion, an evaporator, etc. (hereinafter collectively referred to as "unit") are hermetically connected to one another through pipes, and the refrigerant is circulated in the refrigerant circuit while heat transfer is conducted between the refrigerant and the air, water or the like under the outdoor environment in an outdoor heat exchanger to thereby induce phase variation of the refrigerant, whereby freezing/refrigerating or cooling/heating operation can be performed in an indoor heat exchanger of an indoor unit at the using side.

Further, the control of the refrigerating/air-conditioning apparatus is carried out as follows. For example, a rewritable memory is installed in each unit of the refrigerating/air-conditioning apparatus, such as an outdoor unit, an indoor unit, a remote controller, a central controller, etc., and a control program, control parameters and control data (these data will be hereinafter referred to as "control data, etc.") are stored in the memory so that the refrigerating/air-conditioning apparatus is controlled on the basis of the control data, etc.

In general, a flash memory, EEPROM or the like is used as the rewritable memory, and the control program for controlling each unit is stored in the flash memory while the various control parameters and the control data are stored in EEPROM.

The writing/rewriting of the control data, etc. into such a memory is carried out by using a data writing device (hereinafter referred to as "data writer"). In the conventional refrigerating/air-conditioning apparatus, a data writer is prepared in one-to-one correspondence to each unit of the refrigerating/air-conditioning apparatus (i.e., a data writer is allocated to each of the indoor unit, the outdoor unit, etc.), and electrical control communication data for the control data, etc. are transmitted to a memory installed in a controller equipped to each unit (outdoor unit, indoor unit, etc.) from each data writer which is exclusively connected to the corresponding unit to write/rewrite the control data, etc. into the memory.

Japanese Laid-open Patent Application No. Hei-5-248684 discloses one of these refrigerating/air-conditioning apparatuses. According to this publication, a central controller serially transmits control communication data to the respective memories of plural indoor units, the control communication data containing control target unit type data for discriminating whether the target to be controlled is directed to an individual unit (i.e., individual control mode) or a group of units (i.e., group control mod), target address data for indicating a data transmission target to which the control data, etc. should be transmitted, and the control data, etc. Each indoor unit has a rewritable memory for storing a group number set by a remote controller, an identifier for comparing the self indoor unit number (the indoor unit number of the indoor unit concerned which has been recorded in the identifier) with the indoor unit number indicated by the target address data when the control target unit type data indicates that the target to be controlled is directed to an individual unit, thereby judging whether the control communication data transmitted form the center controller is addressed to the indoor unit concerned itself, or comparing the self group number of the indoor unit concerned (which has been stored in the memory of the indoor unit concerned) with the group number indicated by the target address data when the control target unit type data indicates that the target to be controlled is directed to a unit group, thereby judging whether the control communication data transmitted from the center controller is addressed the indoor unit (group unit) concerned itself, and a driving controller for controlling the driving of the indoor unit concerned according to the control data, etc. transmitted from the central controller when it is judged that the control communication data transmitted from the central controller is addressed to the indoor unit concerned itself.

According to the refrigerating/air-conditioning apparatus as described above, when the central controller executes the group control mode, it takes little time until all of the grouped indoors are actuated, and the rearrangement/alteration of the group can be easily performed. In addition, if the remote controller is designed so that a group number set by a group number setting portion is displayed by a group number display portion, the group number can be easily checked by the user.

In the conventional refrigerating/air-conditioning apparatus in which the control data, etc. are stored in the memory of each unit and the driving of each unit is controlled on the basis of the control data, etc., each data writer is provided in one-to-one correspondence to each unit as described above. However, when wrong control communication data transmitted from a data writer are written/rewritten into some unit, the unit concerned malfunctions or the control of the unit is disturbed. In general, when any unit is connected to a data writer, the control data, etc. transmitted from the data writer are freely written/rewritten into the unit irrespective of the matching between the unit concerned and the control data, etc. For example, if the data writer is erroneously connected to the memory of the controller of some indoor unit although data which should be written/rewritten at this time are originally addressed to the memory of the controller of an outdoor unit, the control data, etc. for the outdoor unit are erroneously written/rewritten in the memory of the indoor unit, that is, undesired control data, etc. are written/rewritten into an unexpected memory.

When the control data, etc. are written/rewritten into an improper unit as described above, not only the unit malfunctions because the construction of constituent elements (hardware) of the unit is different, but also it is generally difficult to find the error and it takes much time to restore the data error. Therefore, much labor is imposed in order to carry out the restoring work.

SUMMARY OF THE INVENTION

The present invention has been implemented in view of the foregoing problems of the conventional refrigerating/air-conditioning apparatus, and has an object to provide a refrigerating/air-conditioning apparatus which can suppress data writing/rewriting error of a data writer into the memories of operating units constituting the refrigerating/air-conditioning apparatus, such as an outdoor unit, an indoor unit, etc., and control units such as a remote controller, a center controller (control board), etc. to thereby performing data writing/rewriting more accurately and surely, and a control method for the refrigerating/air-conditioning apparatus.

According to a first aspect of the present invention, a refrigerating/air-conditioning apparatus including operating/controlling units containing outdoor units for performing heat transfer from/to an outside environment, indoor units connected to the outdoor units through refrigerant pipes, and control devices for controlling the driving of the outdoor units and the indoor units, each operating/controlling unit being equipped with a controller which controls the driving of the unit and has a rewritable memory for storing a control program, control parameter data, control data, etc., and the controllers being connected to one another through communication lines so as to carry out mutual data communications with one another, is characterized by including at least one data writer which is connected to at least one of the operating/controlling units to transmit control communication data to the controllers of the operating/controlling units when the content of the memory of the controller of at least one of the operating/controlling units is required to be written/rewritten, wherein the control communication data contains identification information with which each controller of the operating/controlling units judges whether the control communication data received by the controller is addressed to the controller itself, and if the control communication data is judged to be addressed to the controller, the controller writes/rewrites the control data, etc. of the memory thereof.

According to a second aspect of the present invention, in the above refrigerating/air-conditioning apparatus, the data writer is connected to any one of the operating/controlling units and the communication lines to transmit the control communication data from the one of the operating/controlling units and the communication lines to the controller of at least desired one of the operating/controlling units in order to write/rewrite the control data, etc. of the control communication data into the memory of the controller concerned.

According to a third aspect of the present invention, in the above refrigerating/air-conditioning apparatus, the refrigerating/air-conditioning apparatus as claimed in claim 1, wherein the data writer is mounted in any one of the operating/controlling units to transmit the control communication data from the one of the operating/controlling units to the controller of at least desired one of the operating/controlling units in order to write/rewrite the control data, etc. of the control communication data into the memory of the controller concerned.

According to a fourth aspect of the present invention, in the above refrigerating/air-conditioning apparatus, the control communication data contains target unit type data representing a unit group of same type operating/controlling units having the same function which should be written/rewritten with new control data, etc. and a target unit ID representing an individual target unit to which the writing/rewriting of the control data, etc. is required.

According to a fifth aspect of the present invention, in the above the refrigerating/air-conditioning apparatus, the controller of each operating/controlling unit has an identifier for comparing the target unit ID of the control communication data transmitted from the data writer with a unit ID which is inherently allocated to the operating/controlling unit, thereby judging whether the control communication data transmitted from the data writer are addressed to the operating/controlling unit, and the controller writes/rewrites the content of the memory of the controller if it is judged that the control communication data transmitted from the data writer are addressed to the operating/controlling unit concerned.

According to a sixth aspect of the present invention, in the refrigerating/air-conditioning apparatus, each of the controllers has an indicator for indicating "ID inconsistency" representing that the data writing/rewriting is not carried out if the target unit ID of the control communication data transmitted from the data writer is not coincident with the unit ID allocated to the operating/controlling unit of the controller concerned or indicating "completion of data writing/rewriting" if the target unit ID of the control communication data transmitted from the data write is coincident with the unit ID allocated to the operating/controlling unit of the controller concerned.

According to a seventh aspect of the present invention, in the above refrigerating/air-conditioning apparatus, at least one of the operating/controlling units and the data writer has a display unit, and the indicator indicates "ID inconsistency" to the display unit to display "ID inconsistency".

According to an eight aspect of the present invention, in the above refrigerating/air-conditioning apparatus, the control devices contain a central controller for collectively controlling the driving of the outdoor units and the indoor units.

According to a ninth aspect of the present invention, in the above refrigerating/air-conditioning apparatus, the control devices contain remote controllers for individually controlling the driving of the outdoor units and the indoor units.

According to a tenth aspect of the present invention, a method for controlling a refrigerating/air-conditioning apparatus which includes operating/controlling units containing outdoor units for performing heat transfer from/to an outside environment, indoor units connected to the outdoor units through refrigerant pipes, and control devices for controlling the driving of the outdoor units and the indoor units, each operating/controlling unit being equipped with a controller which controls the driving of the unit and has a rewritable memory for storing a control program, control parameter data, control data, etc., the operating/controlling units being respectively provided with ID codes which are set to be identical to one another when the operating/controlling units have the same function, but different from one another when the operating/controlling units have different functions, and the controllers of the operating/controlling units being connected to one another through communication lines so as to carry out mutual data communications with one another, is characterized by comprising the steps of: transmitting control communication data instructing writing/rewriting of the control data, etc. of the memory of at least one of the operating/controlling units to each of the operating/controlling units, the control communication data containing a target unit ID code for specifying an operating/controlling unit which is required to be subjected to the data writing/rewriting; comparing the target unit ID code with the ID code which is inherently allocated to each operating/ controlling unit receiving the control communication data to judge whether the control communication data containing the target unit ID code is addressed to the operating/controlling unit concerned; and indicating "completion of writing/rewriting of the control data, etc." if the target unit ID code is coincident with the ID code, or indicating "ID inconsistency" and "no writing/rewriting of the control data, etc." if the target unit ID code is not coincident with the ID code.

DETAILED DESCRIPTION OF THE PREFERRED EMBODIMENTS

Preferred embodiments according to the present invention will be described hereunder with reference to the accompanying drawings.

Figure 1:
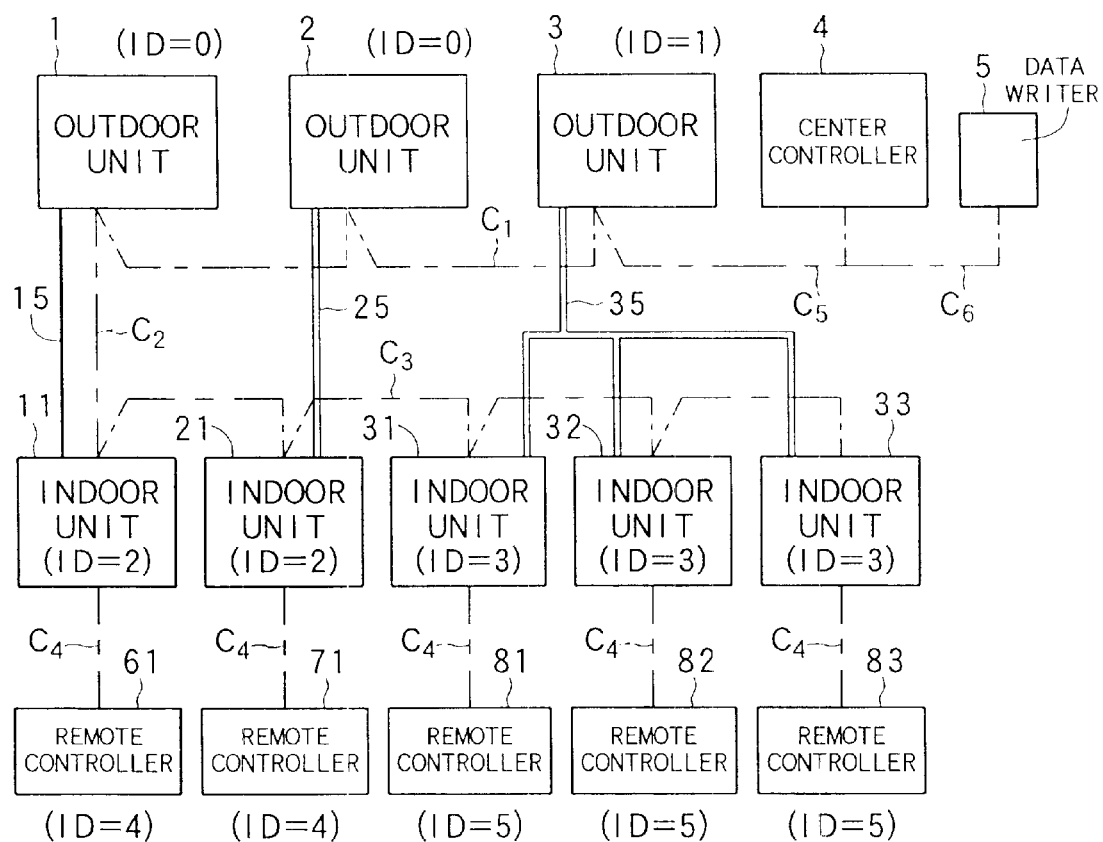
FIG. 1 is a block diagram showing the arrangement of each unit of a refrigerating/air-conditioning apparatus according to an embodiment of the present invention.

FIG. 1 is a block diagram showing the arrangement of each unit constituting a refrigerating/air-conditioning apparatus according to a preferred embodiment of the present invention.

In FIG. 1, the refrigerating/air-conditioning apparatus includes outdoor units 1, 2 and 3, indoor units 11, 21, 31, 32 and 33 and refrigerant pipes 15, 25 and 35 through the indoor units 1,2,3 are connected to the indoor units 11, 21, 31, 32, 33. Specifically, the indoor unit 11 is connected to the outdoor unit 1 through the refrigerant pipe 15, the indoor unit 21 is connected to the outdoor unit 2 through the refrigerant pipe 25 and the indoor units 31, 32 and 33 are connected to the outdoor unit 3 through the refrigerant pipes 35.

In each of the outdoor units 1, 2 and 3, heat transfer is carried out between the heat exchanger (not shown) of each outdoor unit 1, 2, 3 and the outdoor environment such as outside air, water or the like under which the outdoor unit 1, 2, 3 are put, so that the phase of the refrigerant is varied. The phase-varied refrigerant is then supplied to each indoor unit 11, 21, 31, 32, 33. Each indoor unit 11, 21, 31, 32, 33 functions as an apparatus for heating/cooling a room in which the indoor unit is put, or adjusting the temperature in a warehouse or the like to a proper value suitable for freezing/refrigerating operation.

Each of the indoor units 11, 21, 31, 32, 33 is equipped with a controller such as a remote controller (remote control device) 61, 71, 81, 82, 83, or a central controller 4 is commonly equipped to the indoor units so that the temperature of a room or warehouse in which the indoor unit 11, 21, 31, 32, 33 is mounted can be adjusted to a desired temperature. The outdoor units 1, 2 and 3, the indoor units 11, 21, 3132, 33 and the central controller 4 are connected to one another through a communication line(s) (C1 to C6) and a power line (not shown) to thereby fabricate the refrigerating/air-conditioning apparatus.

The controller equipped in each of the units such as the outdoor units, the indoor units, the remote controllers, etc. comprises a microcomputer having a read only memory (ROM) and a rewritable memory (EEPROM, flash memory or the like), and standard control programs are installed in these memories so as to perform the proper temperature control in accordance with specifications (using ways) or requirements at the client side of the refrigerating/air-conditioning apparatus, the setup conditions for the air conditioning/refrigerating operation by an operation manager of the refrigerating/air-conditioning apparatus, or variation of the environment of a room or warehouse in which the refrigerating/air-conditioning apparatus is mounted.

Therefore, through the communication lines C1 to C5, the microcomputers monitor at fixed time intervals the temperature/humidity conditions and the temperature adjusting condition of the room or warehouse in which the refrigerating/air-conditioning apparatus is mounted, and the driving status of each of the outdoor units 1, 2, 3 and the indoor units 11, 21, 31, 32, 33 by using sensors (not shown), and take as monitoring data detection values output from the sensors. On the basis of these monitoring data, the microcomputers transmit driving control instructions based on the control programs stored in the memories through the communication lines to the corresponding units, etc. (outdoor units, indoor units, etc.) to drive the refrigerating/air-conditioning apparatus so that the temperature of the room or warehouse is kept to a preset temperature.

In order to enable more minute refrigerating/air conditioning control to be performed in conformity with the combination of the outdoor units 1, 2 and 3, the indoor units 11, 21, 31, 32, 33, the control unit group, etc. which constitute the refrigerating/air-conditioning apparatus, the specifications or the requirements at the client side at which the refrigerating/air-conditioning apparatus is put, or the setup environment of each unit, the micro-computer of the controller installed in each of the units, etc. is allowed to rewrite the memory content of the built-in rewritable memory to change the control programs and the parameter data as occasion demands.

When such a refrigerating/air-conditioning apparatus as described above is used as a cooling/heating air conditioner, for example, the outdoor units shown in FIG. 1 are used as a normal outdoor unit 1, an outdoor unit 2 for a store and an outdoor unit (outdoor unit group) 3 for multi-room type air condition under which the interiors of plural rooms of a building are heated/cooled.

In this embodiment, the outdoor units 1, 2, 3 and the indoor units 11, 21, 31, 32, 33 are respectively provided with ID codes inherent thereto in accordance with the differences in characteristic of each constituent unit, etc. because the constituent hardware unit, the control characteristic and the individual relevant control program are different among these outdoor and indoor units. These differences also exist among the remote controllers equipped to the respective indoor units, and thus inherent ID codes are also allocated to the respective remote controllers.

This means that each unit to which the same ID code is allocated carries out the control operation for the refrigerating/air-conditioning apparatus in conformity with the client's desired specification (using way), the using environment or the control characteristics on the basis of the substantially same control program. In the case of FIG. 1, for example, an ID code "0" is allocated to the outdoor units 1 and 2, and an ID code "1" is allocated to the outdoor unit 3.

In connection with these outdoor units, the indoor units are fabricated as indoor units 11, 21 for an office or a store and as a unit group of indoor units 31, 32, 33 for cooling/ heating the rooms in a building. Therefore, an inherent ID code "2" is allocated to each of the former indoors 11, 21 while an inherent ID code "3" is allocated to each of the indoor units 31, 32, 33 connected to the outdoor unit 3, whereby the control operation suitable for the air conditioning environments, etc. of the rooms in which these indoor units are put can be performed by the controller of each unit, etc.

Further, in order for the corresponding indoor unit 11, 21, 31, 33 to carry out the control operation properly in accordance with the environment, etc. of each room, the control data, etc. are also stored in the memory of the controller of each of the remote controllers 61, 71, 81, 82, 83 of the indoor units 11, 21, 31, 32, 33, and ID codes are allocated to these remote controllers. For example, an ID code "4" is allocated to the remote controllers 61, 71 and an ID code "5" is allocated to the remote controllers 81, 82, 83.

The ID code set for each unit as described above is stored in the control program or the like of each unit.

In this embodiment, the refrigerating/air-conditioning apparatus is equipped with a data writer 5 for writing/ rewriting control data, etc. into a rewritable memory equipped to the controller of each unit, etc. (the outdoor units 1, 2, 3, the indoor units 11, 21, 31, 32, 33, the remote controllers 61, 71, 81, 82, 83, etc.) as shown in FIG. 5. The data writer 5 may be mounted in any one of the outdoor units 1, 2, 3, the indoor units 11, 21, 31, 32, 33, the remote controllers 61, 71, 81, 82, 83 and the central controllers 4, or it may be connected, directly or through the communication line C, to any one of the communication lines C1 to C5 through which the units, etc. are connected to one another, whereby the data writer 5 is allowed to be connected to the refrigerating/air-conditioning apparatus electrically or communicatively as occasion demands.

In this embodiment of the present invention, the data writer 5 is designed so as to properly write/rewrite the control data, etc. into the memory of the controller of any desired unit irrespective of the unit (communication line) in/to which the data writer 5 is installed/connected.

For example, even when the data writer 5 is connected to the communication line C5 of the central controller 4 through the communication line C6 as shown in FIG. 1, the content of the memory equipped to each of the outdoor units 1, 2, 3, the indoor units 11, 21, 31, 32, 33, the remote controllers 61, 71, 81, 83, etc. can be rewritten (written) with new control data, etc. by using control communication data having a specific data structure and a processing method as described later.

Figure 2:
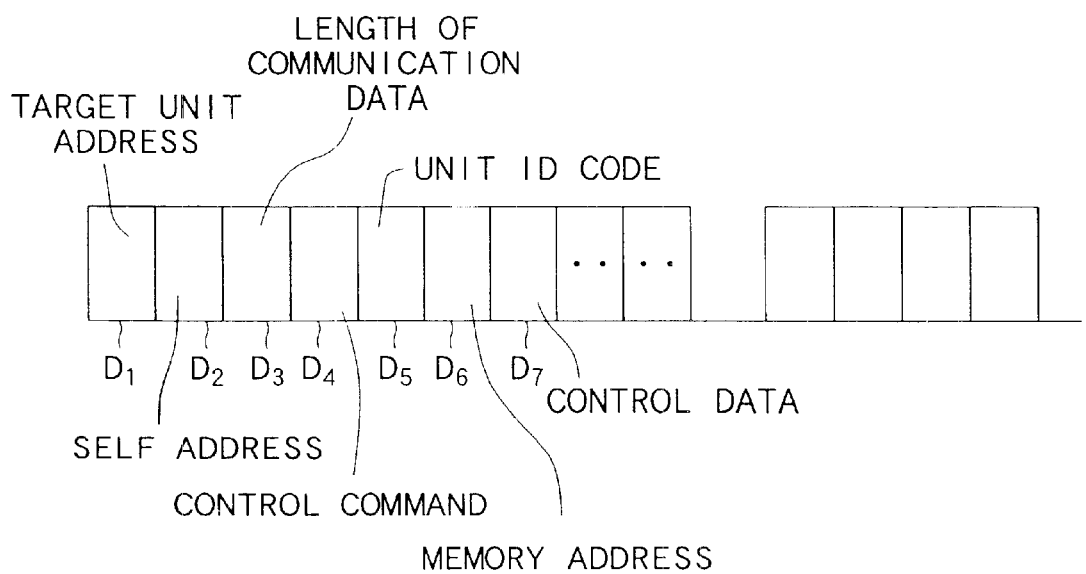
FIG. 2 is a diagram showing the data structure of the main part of control communication data used for the refrigerating/air-conditioning apparatus according to the present invention.

FIG. 2 is a diagram showing the data structure of the main part of control communication data for rewriting the control data, etc. used for the refrigerating/air-conditioning apparatus according to the present invention.

The control communication data transmitted from the data writer 5 includes a writing/rewriting target unit type address D1, a data writer address (self address) D2, a data length D3, a control command D4, a target unit ID code D5 to be written/rewritten with control data, etc., a write-in memory address D6, control data, etc. D7, etc., and serially transmitted from the data writer 5 to each of the unit, etc.

Further, each unit of the outdoor units 1, 2, 3, the indoor units 11, 21, 31, 32, 33, the central controller 4, etc. operates so as to relay the control communication data transmitted from the data writer 5 in accordance with the connection status of the data writer 5 as occasion demands, thereby transmitting the control communication data to the controllers of all the unit, etc.

The writing/rewriting target unit type address D1 specifies a unit or a unit group which should be subjected to the data writing/rewriting operation of the control data, etc. written in the memory of the controller of the unit (unit group) on the basis of the control communication data transmitted from the data writer 5. In the case of the unit arrangement of FIG. 1, the writing/rewriting target unit type address D1 is an address for collectively indicating a group of similar hardware units in all the units, etc. constituting the refrigerating/air-conditioning apparatus, for example, it indicates all the outdoor unit group (all outdoor units 1, 2, 3), all the indoor unit group (all indoor units 11, 21, 31, 32, 33), or all the remote control group (all the remote controllers 61, 71, 81, 82, 83).

By allocating the target unit type address D1 as described above, the controller of each of the units, etc. can easily discriminate the control communication data transmitted from the data writer 5 from the temperature data which are output from the sensors for the refrigerating air condition and flow through the communication lines C1 to C5 at all times or the control signals, etc. output from the remote controllers 61, 71, 81, 82, 83 and the central controller 4.

The control command D4 is a command for indicating the processing of the control data, etc. contained in the control communication data to the microcomputer of a unit or the like which receives the control communication data transmitted from the data writer 5. In many cases, this command instructs to rewrite the content of the control data, etc. written in the memory or write new parameter data into the memory.

With only the target unit type address D1, it is impossible to know which specific target unit in the unit group should be subjected to the rewriting work of the control data, etc. Therefore, the target unit ID code D5 is to specify the individual target unit. That is, the target unit type address D1 specifies a unit group, and the target unit ID code D5 further indicates a specific target unit itself in the unit group indicated by the target unit type address D1. This ID code corresponds to the ID code (ID=1 to ID=5) shown in FIG. 1.

Each unit of the unit group indicated by the target unit type address D1 of the control communication data collates the target unit ID code D5 of the control communication data with the ID code thereof (self ID code). If the ID code D5 is coincident with the self ID code, the unit concerned carries out the work of rewriting the control data, etc. in the rewritable memory of the controller thereof.

If there exist plural units to which the same ID code is allocated, these units are refrigerating air conditioners or control devices which are put under the substantially same control environment or under the substantially same control characteristic, and thus the control data, etc. are simultaneously written/rewritten into the memories thereof by the same control communication data.

As described above, the control data, etc. stored in the memories of the units to which the same ID code is allocated are simultaneously written/rewritten by the control communication data transmitted from the data writer 5. This means that the control data, etc. are rewritten so that the respective units constituting a refrigerating/air-conditioning apparatus have the control characteristics which meet the requirements of a client side, the using way of the client side and the environment in which the units are mounted every time the refrigerating/air-conditioning apparatus is set up, thereby optimizing the control of the refrigerating/air-conditioning apparatus.

As described above, the target unit ID code D5 specifies the unit whose ID code is coincident with the target unit ID code. The writing/rewriting memory address D6 of the control communication data further specifies an address of the memory of the controller of the unit thus specified, at which the control communication data are written/rewritten.

The control data, etc. D7 are supplied to each refrigerating air conditioner or each unit so that the unit, etc. of the refrigerating/air-conditioning apparatus can perform the control suitable for the setup environments thereof or the client's using way and requirements.

In the data structure of the control communication data, if the ID code of any unit of the unit group indicated by D1 is coincident with the target part ID code (D5), the control data, etc. of the control communication data are written/rewritten into the writing/rewriting address of the memory equipped to the unit concerned.

In order to rewrite the content of the memory equipped to each unit by the data writer, the microcomputer of each controller periodically monitors not only the temperature data and the control signals from the sensors as described above, but also the control communication data from the data writer 5 through the communication lines at all times.

Figure 3:
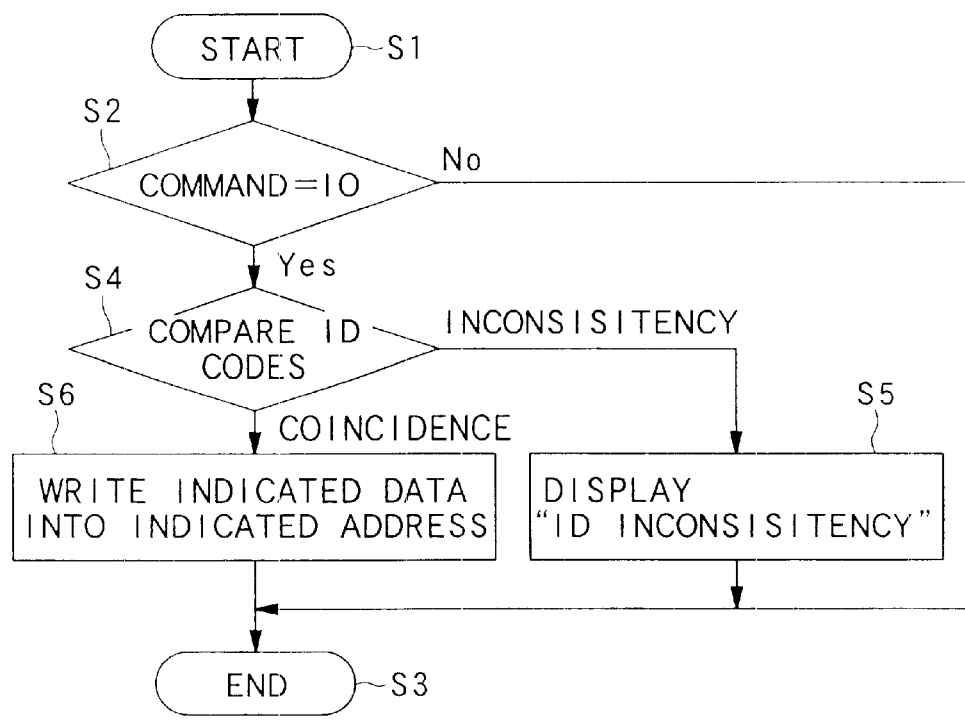
FIG. 3 is a flowchart showing a monitoring operation of control communication data by a controller provided to each unit, etc. constituting the refrigerating/air-conditioning apparatus according to the present invention.

FIG. 3 is a flowchart showing the rewriting operation of the control data, etc. of the controller installed in each unit constituting the refrigerating/air-conditioning apparatus.

The microcomputer of the controller of each unit monitors the control communication data according to the flowchart of FIG. 3. That is, the controller of each unit whose ID code is coincident with the target unit type address of control communication data transmitted from the data writer 5 starts the take-in processing of the control data, etc. (step S1). Subsequently, it is judged whether the control communication data from the data writer contains a rewriting control command (command=10) for instructing to rewrite the content of the memory of the controller (step S2). If the control communication data has no rewriting control command (command=10), the processing immediately goes to step S3 to finish the monitoring operation of the control communication data.

If the control communication data under the communication line has the rewriting control command (command=10) at the time when the monitoring operation is started, the collation and identification of the target unit ID are carried out in step S4.

For example, the outdoor unit and the indoor unit are contained in the same hardware unit group (category), however, these units adopt driving and control manners in accordance with their application fields and functions. Therefore, the control parameter data, the control data, etc. are required to be rewritten every unit group in which the application field and the function are the same. The target unit ID code is newly written in the control communication data to satisfy this requirement.

If it is judged in step S4 that the target unit ID code D5 of the control communication data is coincident with the ID code of the unit concerned, the unit concerned writes/rewrites the control data D7, etc. of the control communication data into the indicated address of the memory of the controller according to the instruction of the writing/rewriting address D6 of the control communication data (step S6), and finishes the monitoring operation of the control communication data from the data writer 5 (step S3).

If it is judged in step S4 that the target unit ID code of the control communication data is not coincident with the ID code of the unit receiving the control communication data, in step S5 the microcomputer of the unit concerned displays "ID inconsistency" on a display of the unit concerned or a display device of the data writer 5 by using LED or the like so as to notify that the control data, etc. of the control communication data are not written/rewritten into the memory of the unit concerned because the ID codes are not coincident, and then finishes the monitoring operation of the control communication data.

Figure 4:
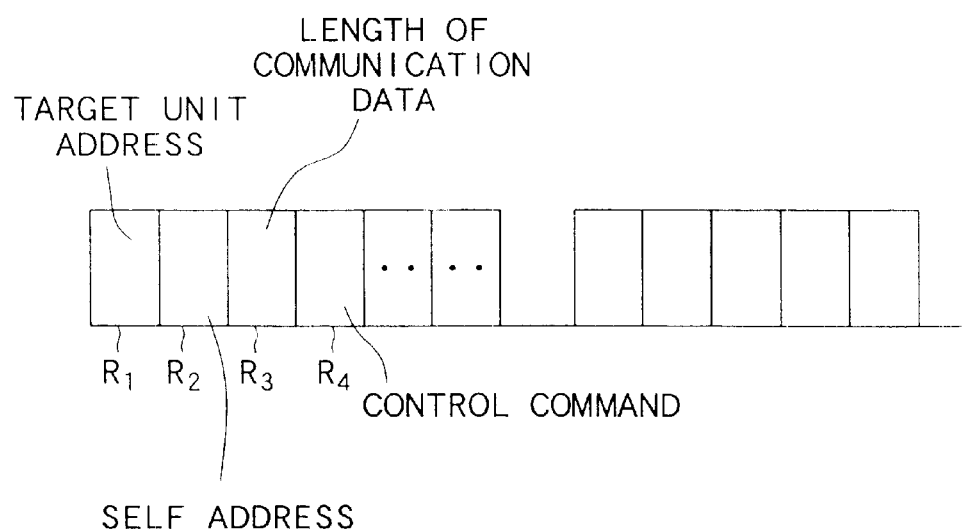
FIG. 4 is a diagram showing the data structure of the main part of return communication data returned from each unit, etc. constituting the refrigerating/air-conditioning apparatus according to the present invention.

FIG. 4 shows the data structure of the main part of return communication data which are returned to the data writer 5 by the unit in which the memory content has been rewritten because the ID code is coincident so that it is notified to the data writer 5 that the control data, etc. in the memory are rewritten according to the control communication data from the data writer 5.

In the return communication data shown in FIG. 4, R1 represents a target unit type address to which this return communication data is transmitted, R2 represents a self address indicating the unit which transmits the return communication data, and R3 represents the data length of the return communication data. The contents of R1 to R3 are similar to the contents of D1 to D3 of the control communication data shown in FIG. 2. Accordingly, the target unit type address R1 at the head of the return communication data represents the data writer 5, and the self address R2 represents the unit in which the control data, etc. have been rewritten on the basis of the control communication data from the data writer 5.

In other words, the unit which has received the control communication data transmitted from the data writer 5 and rewritten the control data, etc. in the memory thereof transmits an electrical message notifying the rewriting of the control data, etc. in the memory thereof to the indicated address of the memory of the data writer 5. At this time, the return communication data containing the control command R4 indicating that the control data, etc. of the control communication data of FIG. 2 have been written/rewritten (command=11) is transmitted to the data writer 5.

Each unit in which the content of the memory has not been rewritten because of the inconsistency of the target unit ID code in step S5 of FIG. 3 although the control communication data are transmitted from the data writer 5 to the unit displays "inconsistency of target unit ID code", and each unit in which the control data, etc. have been rewritten/rewritten in the memory because of the consistency of the target unit ID code returns the return communication data shown in FIG. 4 to the data writer 5 to clarify the rewriting of the content of the memory. Accordingly, a maintainer, a user or the like which intends to write/rewrite the parameter data, the control data, etc. of the controller of some unit can check through the data writer 5 or the like whether the control data, etc. have been surely written/rewritten as is intended.

As described above, the refrigerating air conditioner of the present invention has a mechanism for writing the control data, etc. into the memory of the controller of each unit from any one of the unit constituting the refrigerating/air-conditioning apparatus and the communication lines by using the data writer, and the microcomputer of each unit compares the target unit ID code of the control communication data with the unit ID code of the unit concerned to determine whether the control communication data should be taken into the memory of the controller to write/rewrite the content of the memory, whereby the writing/rewriting work can be more efficiently performed.

As described above, according to the above-described embodiment, the indoor units, the outdoor units, the central controller, etc. are connected to one another through the common communication line, and each unit of the outdoor units, the indoor units, the controllers, etc. constituting the refrigerating/air-conditioning apparatus relays the control communication data from the data writer. The control communication data are designed so as to contain a target unit ID code inherent to each unit which is required to be subjected to the data writing/rewriting operation. Therefore, at the unit side receiving the control communication data, the built-in memory of the unit is rewritten only when the inherent target unit ID code is coincident with the unit ID code of the unit concerned, and the completion of the rewriting is displayed. On the other hand, when the target unit ID code is not coincident with the unit ID code, no writing/rewriting operation is carried out, and this fact is notified by using the display or the like. Therefore, the writing/rewriting operation of the control data, etc. by the data writer can be performed while the control data, etc. are prevented from being written/rewritten into the memory of wrong unit.

Further, in the above-described embodiment, the data writer is designed to transmit the target unit type codes D1 and the unit ID codes D5 for plural unit pieces (outdoor units, indoor units, remote controllers, etc.). However, this embodiment may be modified so that a data writer 5 is replaced by another one every time the target unit type code D1 or the unit ID code is varied. According to this modification, the control data, etc. can be more surely prevented from being written/rewritten into the memory of wrong unit.

According to the refrigerating/air-conditioning apparatus of the present invention, a setup dealer or the like who sets up the refrigerating/air-conditioning apparatus can write/rewrite the control data, etc. for the refrigerating/air-conditioning apparatus by using the data writer which can transmit the control communication data commonly to the unit, etc. constituting the apparatus, thereby enabling the refrigerating/air-conditioning apparatus to be matched with the setup environment, the client's requirements and the using way at the client side.

Further, with the control communication data transmitted from the data writer, the built-in memory of each unit is rewritten only when the unit ID code is coincident, and it is not rewritten when the unit ID code is inconsistent. In the latter case, the fact that the content of the memory is not rewritten is notified by the display or the like. Therefore, it is clarified which unit has been subjected to the data writing/rewriting operation in the unit constituting the refrigerating/air-conditioning apparatus and how the content of the memory is rewritten, so that the trouble of the rewriting of improper control data, etc. can be prevented.

Still further, when the indoor units, the outdoor units, etc. are connected to one another through the communication lines, the control data, etc. of all the units (unit) of the refrigerating/air-conditioning apparatus which are connected to the communication lines can be written/rewritten by using a single common data writer, and the work of matching the refrigerating/air-conditioning apparatus with the client's requirements and the using way at the client side can be efficiently performed.

What is claimed is:

1. A refrigerating/air-conditioning apparatus including operating/controlling units containing outdoor units for performing heat transfer from/to an outside environment, indoor units connected to said outdoor units through refrigerant pipes, and control devices for controlling the driving of said outdoor units and said indoor units, each operating/controlling unit being equipped with a controller which controls the driving of said unit and has a rewritable memory for storing at least one of a control program, control parameter data, and control data, said controllers being connected to one another through communication lines so as to carry out mutual data communications with one another, wherein the apparatus further includes at least one data writer which is connected to at any one of said operating/controlling units containing said outdoor units, said indoor units and said control devices and said communication lines to transmit control communication data to all of said controllers of said operating/controlling units in order to carry out data writing/rewriting on any specific one of said operating/controlling units, wherein the control communication data contains control data to be written/rewritten for said specific one of said operating/controlling units, and identification information for indicating the specific one of said operating/controlling units on which the data writing/rewriting should be carried out, and if any one of said controllers of said operating/controlling units judges that the control communication data is addressed to said controller itself, said controller writes/rewrites the control data in the memory of said controller.

2. The refrigerating/air-conditioning apparatus as claimed in claim 1, wherein said data writer is connected to any one of said operating/controlling units and said communication lines to transmit the control communication data from said one of said operating/controlling units and said communication lines to the controller of at least desired one of said operating/controlling units in order to write/rewrite the control data, etc. of the control communication data into the memory of the controller concerned.

3. The refrigerating/air-conditioning, apparatus as claimed in claim 1, wherein said data writer is mounted in any one of said operating/controlling units to transmit the control communication data from said one of said operating/controlling units to the controller of at least desired one of said operating/controlling units in order to write/rewrite the control data, etc. of the control communication data into the memory of the controller concerned.

4. The refrigerating/air-conditioning apparatus as claimed in claim 1, wherein the control communication data contains target unit type data representing a unit group of same type operating/controlling units having the same function which should be written/rewritten with new control data, etc. and a target unit ID representing an individual target unit to which the writing/rewriting of the control data, etc. is required.

5. The refrigerating/air-conditioning apparatus as claimed in claim 4, wherein the controller of each operating/controlling unit has an identifier for comparing the target unit ID of the control communication data transmitted from said data writer with a unit ID which is inherently allocated to said operating/controlling unit, thereby judging whether the control communication data transmitted from said data writer are addressed to said operating/controlling unit, and said controller writes/rewrites the content of said memory of said controller if it is judged that the control communication data transmitted from said data writer are addressed to said operating/controlling unit concerned.

6. The refrigerating/air-conditioning apparatus as claimed in claim 5, wherein each of said controllers has an indicator for indicating "ID inconsistency" representing that the data writing/rewriting is not carried out if the target unit ID of the control communication data transmitted from said data writer is not coincident with the unit ID allocated to the operating/controlling unit of the controller concerned or indicating "completion of data writing/rewriting" if the target unit ID of the control communication data transmitted from said data write is coincident with the unit ID allocated to the operating/controlling unit of the controller concerned.

7. The refrigerating/air-conditioning apparatus as claimed in claim 6, wherein at least one of said operating/controlling units and said data writer has a display unit, and said indicator indicates "ID inconsistency" to said display unit to display "ID inconsistency".

8. The refrigerating/air-conditioning apparatus as claimed in claim 1, wherein said control devices contain a central controller for collectively controlling the driving of said outdoor units and said indoor units.

9. The refrigerating/air-conditioning apparatus as claimed in claim 1, wherein said control devices contain remote controllers for individually controlling the driving of said outdoor units and said indoor units.

10. A method for controlling a refrigerating/air-conditioning apparatus which includes operating/controlling units containing outdoor units for performing heat transfer from/to an outside environment, indoor units connected to the outdoor units through refrigerant pipes, and control devices for controlling the driving of the outdoor units and the indoor units, each operating/controlling unit being equipped with a controller which controls the driving of said unit and has a rewritable memory for storing a control program, control parameter data, control data, etc., the operating/controlling units being respectively provided with ID codes which are set to be identical to one another when the operating/controlling units have the same function, but different from one another when the operating/controlling units have different functions, and the controllers of the operating/controlling units being connected to one another through communication lines so as to carry out mutual data communications with one another, characterized by comprising the steps of:

transmitting control communication data instructing writing/rewriting of the control data, etc. of the memory of at least one of the operating/controlling units to each of the operating/controlling units, the control communication data containing a target unit ID code for specifying an operating/controlling unit which is required to be subjected to the data writing/rewriting;

comparing the target unit ID code with the ID code which is inherently allocated to each operating/controlling unit receiving the control communication data to judge whether the control communication data containing the target unit ID code is addressed to the operating/controlling unit concerned; and indicating "completion of writing/rewriting of the control data, etc." if the target unit ID code is coincident with the ID code, or indicating "ID inconsistency" and "no writing/rewriting of the control data, etc." if the target unit ID code is not coincident with the ID code.

* * * * *